(12) United States Patent
Kim et al.

(10) Patent No.: US 7,479,259 B2
(45) Date of Patent: Jan. 20, 2009

(54) SYSTEM FOR DESTROYING HAZARDOUS WASTE RESULTANT FROM THE PRODUCTION OF ENERGETICS SUCH AS EXPLOSIVES

(75) Inventors: Byung J. Kim, Champaign, IL (US); Seok-Young Oh, Newark, DE (US); Pei C. Chiu, Hockessin, DE (US); Daniel K. Cha, Newark, DE (US)

(73) Assignee: The United States of America as represented by the Secretary of the Army, Washington, D.C.

(*) Notice: Subject to any disclaimer, the term of this patent is extended or adjusted under 35 U.S.C. 154(b) by 0 days.

(21) Appl. No.: 11/808,948

(22) Filed: Jun. 14, 2007

(65) Prior Publication Data

US 2008/0099385 A1    May 1, 2008

(51) Int. Cl.
*B01J 8/02* (2006.01)
(52) U.S. Cl. .................... 422/190; 588/900
(58) Field of Classification Search .......... 588/403, 588/900; 210/743, 739, 717, 757, 748, 722, 210/631, 759, 711, 713, 709, 719, 721, 724, 210/726, 909; 405/128.5; 86/50; 422/190
See application file for complete search history.

(56) References Cited

U.S. PATENT DOCUMENTS

| | | | |
|---|---|---|---|
| 4,073,726 A | 2/1978 | Okamoto | |
| 4,483,829 A * | 11/1984 | Guardini | 423/55 |
| 5,538,636 A * | 7/1996 | Gnann et al. | 210/631 |
| 5,611,642 A | 3/1997 | Wilson | |
| 5,611,936 A | 3/1997 | Fernando et al. | |
| 5,616,253 A | 4/1997 | Fernando et al. | |
| 5,733,067 A | 3/1998 | Hunt | |
| 5,759,389 A | 6/1998 | Fernando et al. | |
| 5,783,088 A | 7/1998 | Amonette et al. | |
| 5,789,649 A | 8/1998 | Batchelor et al. | |
| 5,833,388 A | 11/1998 | Edwards | |

(Continued)

OTHER PUBLICATIONS

Oh, Seok-Young; et al., Effect of Adsorption to Elemental Iron on the Transformation of 2,4,6-Trinitrotoluene and Hexhydro-1,3,5-Trinitro-1,3,5-Triazine in Solution, Environ.

(Continued)

*Primary Examiner*—Wayne Langel
*Assistant Examiner*—Brittany M Martinez
(74) *Attorney, Agent, or Firm*—Earl H. Baugher, Jr.

(57) ABSTRACT

A waste stream from energetics processing is treated using a pre-filter having media, preferably sand, and a metal that has a reducing potential, preferably elemental iron ($Fe^0$). The pre-filter is connected to a zero-valent metal column reactor. The waste stream is pumped through the pre-filter to trap solids and deoxygenate it, then enters the reactor and is subjected to a reducing process. $Fe^0$ from the reactor is transformed to the ferrous ion ($Fe^{+2}$), added to the resultant product, and fed to a continuously stirred tank reactor (CSTR) in which Fenton oxidation occurs. This product is then sent to a sedimentation tank and pH-neutralized using a strong base such as sodium hydroxide (NaOH). The aqueous portion is drawn off and the sludge pumped from the sedimentation tank. Both tanks are monitored and controlled to optimize required additives, while monitoring of pressure drop across the pre-filter and column reactor establishes replacement requirements.

20 Claims, 4 Drawing Sheets

U.S. PATENT DOCUMENTS

| | | | |
|---|---|---|---|
| 5,857,810 | A | 1/1999 | Cantrell et al. |
| 5,967,230 | A | 10/1999 | Cooper et al. |
| 5,975,798 | A | 11/1999 | Liskowitz et al. |
| 5,975,800 | A | 11/1999 | Edwards et al. |
| 6,080,906 | A * | 6/2000 | Johnson et al. .......... 435/262.5 |
| 6,132,623 | A * | 10/2000 | Nikolaidis et al. .......... 210/719 |
| 6,206,098 | B1 | 3/2001 | Cooper et al. |
| 6,207,114 | B1 | 3/2001 | Quinn et al. |
| 6,663,781 | B1 | 12/2003 | Huling et al. |
| 7,335,246 | B2 | 2/2008 | Huling et al. |

OTHER PUBLICATIONS

Oh, Seok-Young, et al., Enhancing Fenton Oxidation of TNT and RDX through Pretreatment with Zero-Valent Iron; Water Research 37, 4275-83 (2003).

Oh, Seok-Young, et al., Enhancing Oxidation of TNT and RDX in Wastewater: Pre-Treatment with Elemental Iron; Water Science and Tech., vol. 47, No. 10, 93-99 (2003).

Oh, Seok-Young, et al., Reduction of Nitroglycerin with Elemental Iron: Pathway, Kinetics, and Mechanisms; Environ. Sci. Technol., 38, 3723-30 (2004).

Oh, Seok-Young, et al., Conceptual Comparison of Pink Water Treatment Technologies: Granular Activated Carbon, Anaerobic Fluidized Bed, and Zero-Valent Iron-Fenton Process; Water Sciences & Technology vol. 49, No. 5-6, 129-36 (2004).

Oh, Seok-Young, et al.,Reductive Transformation of Hexahhydro-1,3,5-Trinitro-1,3,5-Triaxine, Octahydro-1,3,5,7-Tetranitro-1,3,5,7-Tetrazocine, and Methyleedninitramine with.

Oh, Seok-Young, et al., Zero-Valent Iron Pretreatment for Enhancing the Biodegradability of RDX; Water Research 39, 5027-32 (2005).

Oh, Seok-Young, et al., Zero-Valent Iron Treatment of RDX-containing and Perchlorate-containing Wastewaters from an Ammunition Plant at Elevated Temperatures; Water Sci. & Tech., vol. 54, No. 10,47-53 (2006).

Kim, Byung J., Affidavit, Aug. 6, 2008, In re: U.S. Appl. No. 11/808,948.

* cited by examiner

SYSTEM FOR DESTROYING HAZARDOUS WASTE RESULTANT FROM THE PRODUCTION OF ENERGETICS SUCH AS EXPLOSIVES

STATEMENT OF GOVERNMENT INTEREST

Under paragraph 1(a) of Executive Order 10096, the conditions under which this invention was made entitle the Government of the United States, as represented by the Secretary of the Army, to an undivided interest therein on any patent granted thereon by the United States. This and related patents are available for licensing to qualified licensees. Please contact Bea Shahin at 217 373-7234.

RELATED INVENTIONS

Under 35 U.S.C § 121, this application claims the benefit of U.S. patent application Ser. No. 11/229,441, A Process for Treating Waste from the Production of Energetics, by Cha et al., filed Sep. 8, 2005, a divisional of prior co-pending U.S. patent application Ser. No. 10/097,089, A Process and System for Treating Waste from the Production of Energetics, by Cha et al., filed Mar. 14, 2002 and inadvertently abandoned, both of which are incorporated herein by reference.

BACKGROUND

Carbon sorption is the conventional method for treating munitions manufacturing waste containing explosive compounds such as 2,4,6 trinitrotoluene (TNT), trimethylenetrinitronitramine (RDX), and tetramethylenetetranitramine (HMX). The liquid form of this waste is termed "pinkwater." Typically using granulated activated carbon (GAC) filters, the waste is passed through the GAC with the explosive constituents removed by sorbing onto the carbon. This method is non-destructive, i.e., the sorbed molecules of contaminant remain intact chemically. Thus, the process generates spent contaminant-laden GAC filters that require further treatment, to include regeneration of the carbon filter for re-use or safe disposal at the end of the filter's useful life. The U.S. military and its contractors generate a substantial amount of spent GAC from pinkwater treatment and would save considerable resources by replacing the GAC filtration process with a process that actually destroys or neutralizes energetic contaminants.

Thus, it is a given that conventional sorbing processes have several disadvantages that are immutable. Further, direct oxidation by chemical or biological processes is not as efficient as sequential reduction/oxidation processes due to the relatively oxidized nature of energetics.

It is known to use the Fenton reaction for oxidizing hydrocarbons to their constituents. Typically, the oxidizing agent used in the reaction is hydrogen peroxide, $H_2O_2$. Mixed with a metallic salt, $H_2O_2$ produces a free radical that breaks the bonds of a hydrocarbon molecule in an exothermic reaction. This results in a low-free-energy-state generally associated with the production of carbon dioxide ($CO_2$) and water.

Elemental iron ($Fe^0$) oxidizes to $Fe^{+2}$ in the presence of oxygen. This removes most of the oxygen from the solution and contributes to the solution attaining an anaerobic state.

Zero-valent iron has been used in permeable reactive barriers (PRBs), an emerging technology that has been applied in recent years to remediate groundwater contaminated with a wide range of pollutants. *Permeable Reactive Barrier Technologies for Contaminant Remediation,* EPA/600/R-98/125, U.S. EPA, September 1998; *Field Applications of In Situ Remediation Technologies: Permeable Reactive Barriers,* EPA/542/R-99/002, U.S. EPA, June 1999. Iron is a strong reducing agent ($E^0=-0.44V$) and can reduce relatively oxidized pollutants, including chlorinated solvents, metals, nitrate, and radionuclides. U.S. EPA (September 1998).

Researchers have shown that iron can reduce TNT, RDX, and HMX at high rates. Hundal, L. S., et al., *Removal of TNT and RDX from Water and Soil Using Iron Metal, Environmental Pollution,* 97: 55-64, 1997. Further, the Fenton reaction is an established process applied to treat a wide variety of pollutants in hazardous wastes, wastewater, and groundwater. Eckenfelder, W. W., *The Role of Chemical Oxidation in Waste Treatment Processes, Proceedings of the First International Symposium on Chemical Oxidation,* Technomic Publishing Co., Inc., Lancaster, Pa., pp. 1-10, 1992; Huang, C. P. et al., *Advanced Chemical Oxidation: Its Present Role and Potential Future in Hazardous Waste Treatment, Waste Management,* 16: 361-377, 1993.

The well-known Fenton reaction has been used in a number of recent patents dealing with environmental remediation. For example, for in-situ subterranean treatment of contaminated ground water or soil, the following employ the Fenton reaction as at least a part of their process: U.S. Pat. No. 6,206,098, In situ Water and Soil Remediation Method and System, to Cooper et al., Mar. 27, 2001 using a catalyst prior to injection of an oxidizer to initiate the Fenton reaction; U.S. Pat. No. 5,967,230, In situ Water and Soil Remediation Method and System, to Cooper et al., Oct. 19, 1999; and U.S. Pat. No. 5,611,642, Remediation Apparatus and Method for Organic Contamination in Soil and Groundwater, to Wilson, Mar. 18, 1997, describing a subterranean system for implementing the Fenton reaction.

U.S. Pat. No. 5,789,649, Method for Remediating Contaminated Soils, to Batchelor, et al., Aug. 4, 1998, describes the use of zero-valent iron and a catalytic metal to degrade chlorinated compound contaminated soil. U.S. Pat. Nos. 5,611,936, 5,616,253, Apr. 1, 1997; and U.S. Pat. No. 5,759,389, Jun. 2, 1998, all entitled Dechlorination of TCE with Palladized Iron, all to Fernando, et al., describe a method to de-chlorinate TCE with elemental iron having a palladium coating.

Zero-valent iron is used for at least part of the remediation process in establishing subterranean permeable reactive barriers as described in U.S. Pat. No. 5,733,067, Method and System for Bioremediation of Contaminated Soil Using Inoculated Support Spheres, to Hunt, et al., Mar. 31, 1998; U.S. Pat. Nos. 5,833,388, Nov. 10, 1998, and 5,975,800, Nov. 2, 1999, both entitled Method for Directing Groundwater Flow and Treating Groundwater In Situ, both to Edwards and Dick; U.S. Pat. No. 5,857,810, In Situ Chemical Barrier and Method of Making, to Cantrell and Kaplan, Jan. 12, 1999; and U.S. Pat. No. 6,207,114, Reactive Material Placement Technique for Groundwater Treatment, to Quinn, et al., Mar. 27, 2001.

Zero-valent iron powder has been used for in-situ decontamination of halocarbons and metals more noble than iron as described in U.S. Pat. No. 5,975,798, In Situ Decontamination of Subsurface Waste Using Distributed Iron Powder, to Liskowitz et al., Nov. 2, 1999. U.S. Pat. No. 6,132,623, Immobilization of Inorganic Arsenic Species Using Iron, to Nikolaidis, et al., Oct. 17, 2000, describes the use of zero-valent iron to immobilize inorganic arsenic species. U.S. Pat. No. 5,783,088, Method of Removing Oxidized Contaminants from Water, to Amonette, et al., Jul. 21, 1998, describes treatment of oxidized contaminants using a layered aluminosilicate incorporating Fe(II).

U.S. Pat. No. 5,538,636, Process for Chemically Oxidizing Highly Concentrated Waste Waters, to Gnann et al., Jul. 23, 1996, uses the Fenton reaction together with electrolysis and multiple steps of neutralization to purify wastewater and address problems associated with the sludge resulting therefrom.

SUMMARY

The process provided by a preferred embodiment of the present invention transforms the energetic compounds in waste associated with munitions production and de-commissioning. It eliminates the need for subsequent treatment or re-generation with attendant concerns of possible secondary contamination. The process involves at least one pre-filtration and two sequential reduction and oxidation reactions and a post-reaction neutralization process to break down energetics to innocuous end products such as carbon dioxide, water, and environmentally benign products precipitated in a sludge.

The two-step treatment process combines two known treatment technologies: zero-valent metal reduction and Fenton oxidation. It also provides a final "polishing" step in which the acid pH of the mixture resulting from the Fenton reaction is neutralized and sediment settled out of the aqueous mixture.

It capitalizes on the advantages of each of the individual reduction and oxidation reactions and the resulting synergism of their serial combination. The neutralization post-treatment step enables re-use of the water by-product and stabilizes any resulting precipitated sludge.

The system uses a pre-filter containing filter media and a zero-valent metal, a first vessel for conducting the Fenton oxidation, and a second vessel for pH-neutralizing the treated waste and allowing it to settle prior to drawing off water for re-use and pumping any resultant sludge for further disposition. The system is designed to handle those highly oxidized waste streams that would not ordinarily lend themselves to Fenton oxidation, such as those containing energetics, in particular TNT, RDX, HMX, and combinations thereof.

The pre-filter system may use natural material as filter media such as sand or diatomaceous earth or manmade material such as polystyrene particles. Although elemental iron ($Fe^0$) is the most cost-effective and efficient to use, metals such as tin, aluminum, zinc, magnesium, nickel, palladium, platinum, and combinations thereof may be used with the filter media. Upon reaction of the elemental iron with the waste stream, at least part of it is converted to the ferrous ion ($Fe^{+2}$) and combined with the filtered and now initially treated waste stream. The iron and sand may be incorporated in a replaceable vented cartridge, the venting providing for safely dumping accumulating gases, such as hydrogen.

The system may also use a mix control module to facilitate automated control of the mix within the Fenton oxidation reactor and the settling tank. The mix control module monitors and controls the pH of each of the reactor and the settling tank as well as the amount of the oxidizer, typically hydrogen peroxide ($H_2O_2$), and metal ion, typically the ferrous ion $Fe^{+2}$, in the Fenton reactor. A preferred reactor would be of the continuous stirred tank reactor (CSTR) type. Alternatively, the Fenton reactor could be a tank provided with an impeller mixer.

For the settlement tank, pH is neutralized to within the range of 6.0-8.0 by adding a base, such as NaOH, and suspended solids are permitted to settle, forming sludge. A sludge pump is provided for emptying the settling tank periodically as needed.

In a preferred embodiment, the Fenton reactor is positioned lower than the zero-valent reactor thus enabling gravity feed of the filtered and reduced waste stream from the zero-valent reactor to the Fenton reactor. Likewise the settling tank is positioned lower than the Fenton reactor thus enabling gravity feeding of the contents of the Fenton reactor to the settling tank. The integrated use of a preferred embodiment of the present invention in the processing line of a manufacturing plant is envisioned.

Advantages of a preferred embodiment of the present invention include:

uses low-cost scrap metal as the zero-valent metal, typically scrap iron;

first filters and then treats the resultant filtered solution in one "zero-valent metal" reactor column;

provides for venting any resultant hydrogen gas at the top of the zero-valent reactor column;

provides a pH monitoring and control system to optimize a Fenton reaction;

treats energetic compounds in a controlled reactor;

eliminates the need for GAC and concomitant regeneration and solid waste disposal;

presents a small footprint when compared to conventional waste processors;

may be incorporated in a mobile system, to include trailer-mounting;

eliminates a currently employed complex environmental monitoring system needed for both the process and resultant products (sludge, $CO_2$, and clean water);

achieves lower overall system capital and maintenance costs than existing systems;

achieves lower cost of final by-product disposal than existing systems;

monitors the process easier and at less cost than existing systems; and requires only a low skill level for system operation.

Compared to presently used methods, a preferred embodiment of the present invention replaces traditional GAC filtration while reducing the need for subsequent processing and regeneration of the GAC.

DETAILED DESCRIPTION

A preferred embodiment of the present invention incorporates pre-filtration and a reduction and an oxidation reaction process seriatim. Pre-filtration employs a filter media, such as a fine sand and a zero-valent metal, to filter solids and de-oxygenate the waste stream in the first process. The first process involves the use of a metal having an inherent reducing potential, typically elemental iron ($Fe^0$) available as scrap iron, while the second process facilitates the well-known Fenton reaction. The pre-filtration and first process may be accomplished in the same vessel. To enable re-use of any aqueous portion of the waste stream, a final "polishing" step may be employed to neutralize the effluent resultant from the second process (Fenton reaction).

Figure 1:
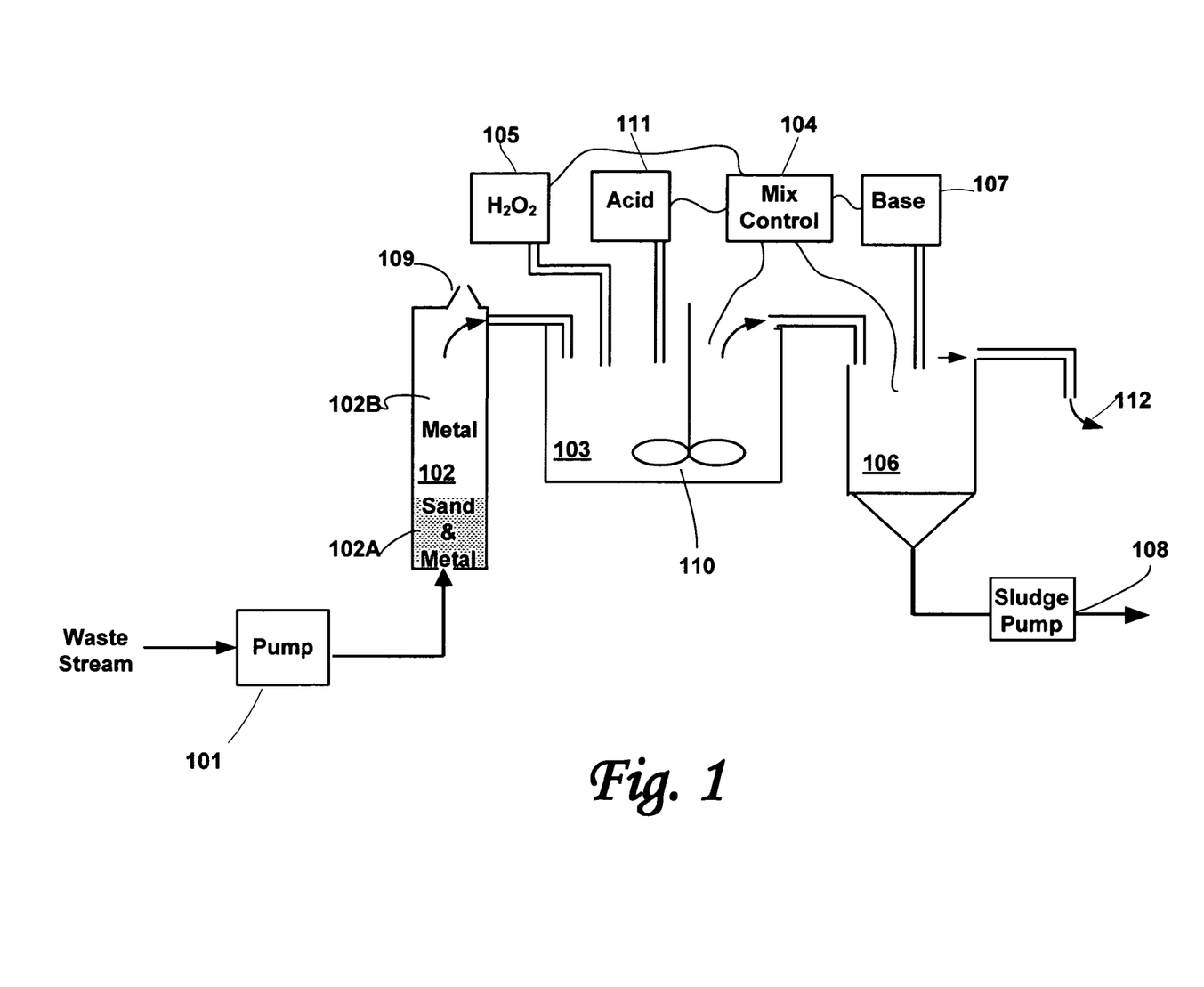
FIG. 1 is a schematic of a system embodying a preferred embodiment of the invention, presenting the sequential zero-valent metal reduction and Fenton oxidation process.

A schematic diagram of a preferred embodiment of the present invention is illustrated in FIG. 1. A waste stream is provided via a pump 101. The first treatment uses a pre-filter 102A and a zero-valent metal column reactor 102B. A pre-filter 102A containing sand and zero-valent metal filters solids, such as particles of TNT, RDX, HMX, nitroglycerin (NG), and "de-oxygenates" the aqueous portion of the waste stream through a chemical reducing reaction facilitated by the zero-valent metal in the pre-filter 102A and the zero-valent column reactor 102B. The ratio of sand to metal is maintained at a level sufficient to treat the expected waste stream, with a typical value of 85% sand to 15% elemental iron. Next, the product from the pre-filter 102A, i.e., filtered water containing energetic compounds, is reduced in the zero-valent column reactor 102B. Both the pre-filter 102A and the zero-valent metal column reactor 102B are vented to prevent accumulation of hydrogen gas by providing a breather 109 at the top of the zero-valent column reactor 102B.

The Fenton reaction reactor 103 uses iron released from a zero-valent column reactor 102B as $Fe^{+2}$, together with injected hydrogen peroxide ($H_2O_2$) 105, to complete the remediation of the pinkwater and associated solid wastes. To optimize the reaction, provision is made for injection of an acid 111, typically sulfuric acid, to maintain a sufficiently low pH of 2.0-3.0. Normally, the amount of $Fe^{+2}$ generated in the zero-valent column reactor 102B will be sufficient to carry the Fenton reaction. Should this not be the case, the same injection system used to provide the acid 111 may be used to supplement the Fenton reaction with additional metal. An impeller mixer 110 is provided in the Fenton reaction tank 103 to insure complete mixing and subsequent transformation of the energetic intermediates.

A settling tank 106 into which a strong base 107, such as sodium hydroxide (NaOH), is mixed is provided to both neutralize the resultant product and to separate the aqueous part from the solids. This tank 106 is also monitored via a controller 104 to maintain optimum pH. The solids are removed as a benign sludge by a sludge pump 108 while the aqueous portion 112 is re-cycled as needed.

Scrap iron is an industrial waste material that is readily available and relatively inexpensive. A sand and iron pre-filter 102A, with an inherently long service life, facilitates a passive process that requires little maintenance or regeneration, requiring only a pump 101 to draw the waste stream into it. Degradation of zero-valent iron does not generate toxic by-products. The reduction products of the energetics may be of concern, however. The subsequent Fenton oxidation process, fully oxidizing the reduction products to benign constituents such as CO2, water, and benign inorganic compounds, breaks down these products.

It may be difficult for Fenton's reagent alone to oxidize energetics due to their highly oxidized nature. This is addressed uniquely in a preferred embodiment of the present invention by using a combination of a pre-filter 102A and a zero-valent metal column reactor 102B to reduce the explosives to products that are much more amenable to processing using the Fenton reaction. Yet another advantage of a preferred embodiment of the present invention is the use of the $Fe^{+2}$ (a degradation by-product of the pre-treatment process) in the subsequent Fenton reactor 103, thereby reducing the need for supplying commercial ferrous additives.

This innovative treatment system specifically removes and "mineralizes" TNT and heterocyclic nitramines (RDX and HMX) from pinkwater.

Figure 2:
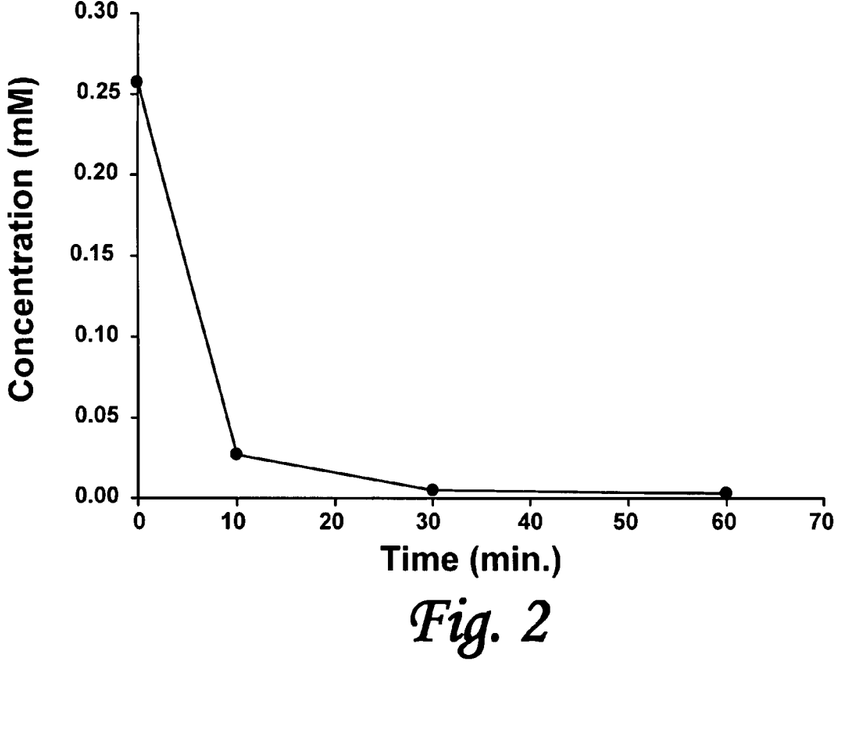
FIG. 2 is a graph presenting the results of TNT reduction with zero-valent iron.
Figure 3:
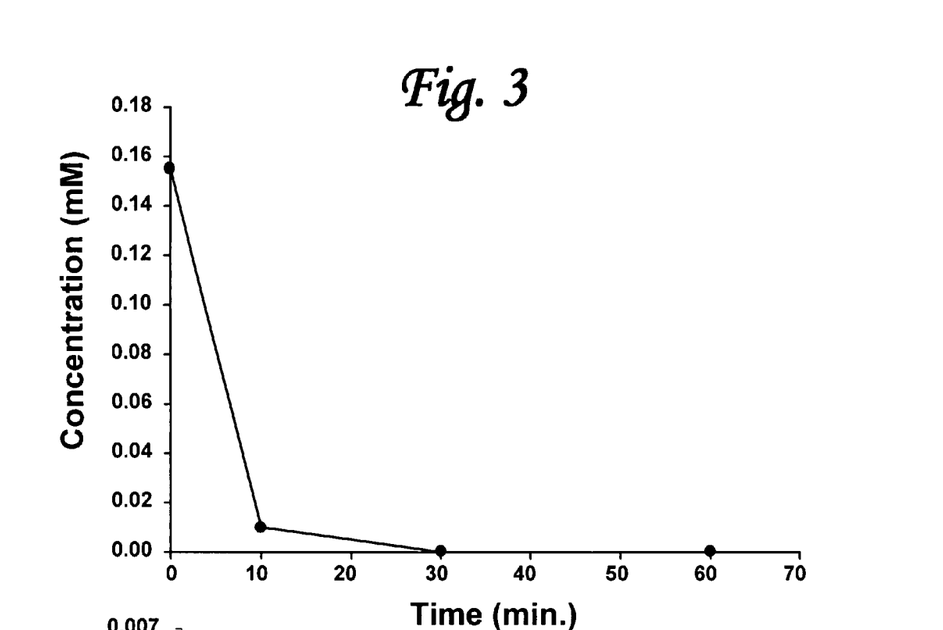
FIG. 3 is a graph presenting the results of RDX reduction with zero-valent iron.
Figure 4:
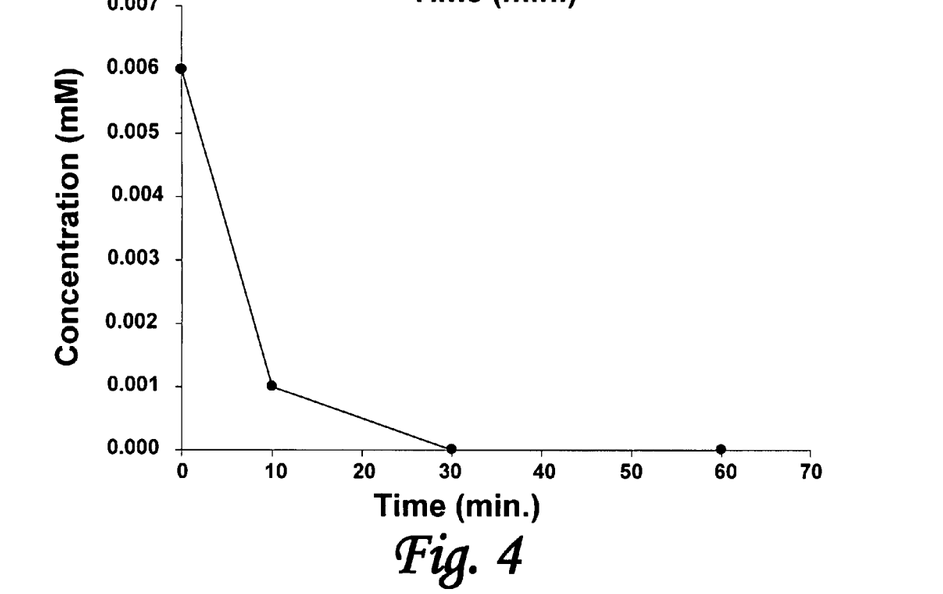
FIG. 4 is a graph presenting the results of HMX reduction with zero-valent iron.

The U.S. Army Engineer Research and Development Center (ERDC) in cooperation with the University of Delaware conducted bench scale tests on the processes of the instant invention. Refer to FIGS. 2-4 for results of TNT, RDX and HMX reduction experiments conducted on bench scale reactors using these commonly available materials: sand and scrap iron in a pre-filter 102A, scrap iron in a zero-valent column reactor 102B, hydrogen peroxide and sulfuric acid added to a first vessel 103 comprising the Fenton reactor, and sodium hydroxide to base-neutralize the resultant acidic waste stream in a second vessel 106. The majority of TNT (FIG. 2) in solution was removed within 30 minutes. Similarly, RDX (FIG. 3) and HMX (FIG. 4) in solution were completely removed within 30 minutes.

Figure 5:
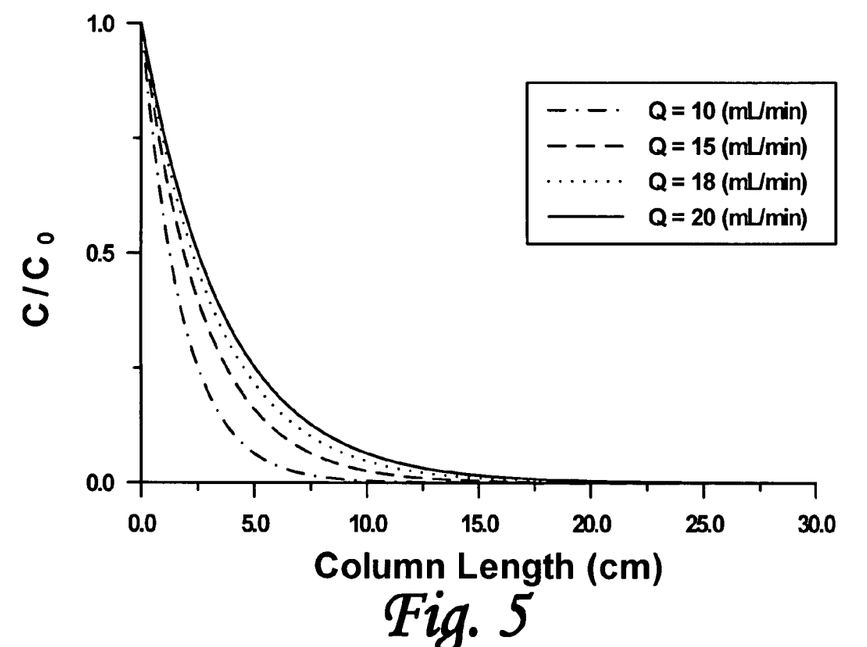
FIG. 5 presents the relationship for estimated concentrations of TNT vs. zero-valent metal column reactor length at various flow rates and a first rate constant.
Figure 6:
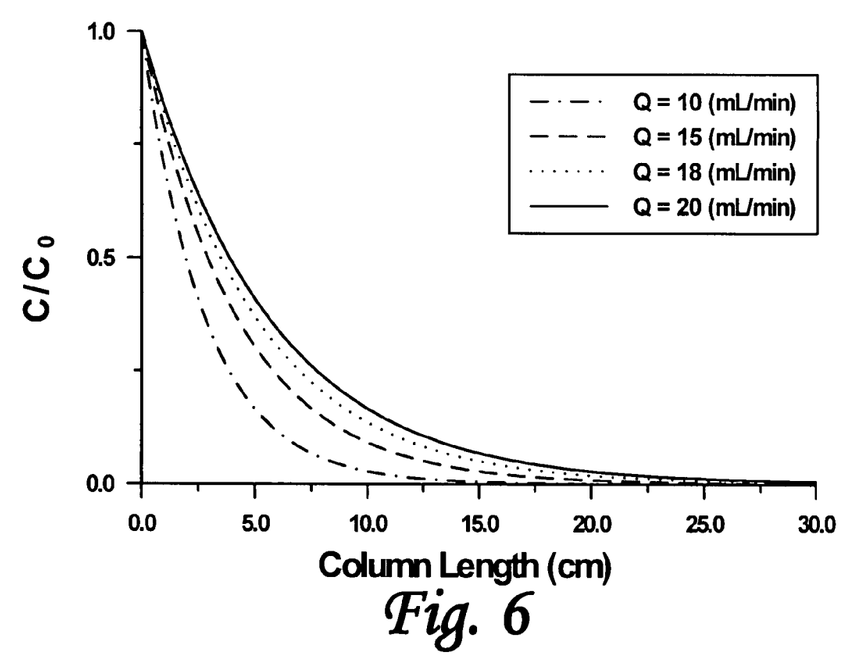
FIG. 6 presents the relationship for estimated concentrations of RDX vs. zero-valent metal column reactor length at various flow rates using the design equation in which the rate constant, k, is $0.0185\ s^{-1}$, the column ID is 2.5 cm, and the porosity is 0.66.

Refer to FIGS. 5 and 6. Preliminary experiments using a glass column of 2.5 cm diameter filled with scrap iron rapidly reduced TNT (FIG. 5) and RDX (FIG. 6). Results from the column study show that the concentrations of TNT and RDX in column effluent can be predicted using the advection-dispersion-reaction equation:

$$\frac{\partial C_A}{\partial t} = D_L \frac{\partial^2 C_A}{\partial x^2} - u \frac{\partial C_A}{\partial x} - kC_A$$

where $C_a$ is the concentration of the contaminant in the aqueous phase; t is time; $D_L$ is the longitudinal dispersion coefficient, x is the coordinate in the flow direction; μ is mean interstitial water velocity and k is a constant selected for a class of contaminants.

To evaluate whether the metal pre-treatment in the pre-filter 102A and zero-valent metal column reactor 102B will enhance the subsequent Fenton oxidation process, experiments were carried out to study mineralization of the reduction products of the explosive compounds by Fenton's reagent ($H_2O_2$ and $Fe^{+2}$). A five-fold increase was observed in mineralization of TNT due to $Fe^0$ pre-treatment. In another study, $H_2O_2$ (40 mM) was added to effluent from a zero-valent column reactor 102B, which received a wastewater containing TNT and RDX. No TNT or RDX was detected in the effluent, indicating that TNT and RDX were completely reduced to TAT and the ring cleavage products of RDX, respectively. Subsequent $H_2O_2$ addition mineralized 50% of TAT and greater than 95% of RDX reduction products within 100 minutes.

Refer to FIG. 1. A pump 101 provides the waste to a preferred embodiment of the present invention. A preferred embodiment uses a unit 102 that incorporates a pre-filter 102A containing filter media and zero-valent metal for filtration of solids and de-oxygenation of the wastewater stream and a zero-valent metal column reactor 102B to reduce the highly oxidized state of the energetics in the waste stream; a Fenton reaction vessel 103 to which a strong oxidizer, typically hydrogen peroxide, is added to mineralize the metal-treated energetics in the waste stream; a mix control system 104; a supply 105 of oxidizer; a neutralization and sedimentation tank 106; and a source 107 of a strong base, the amount of additives controlled by a mix control 104. The waste stream may be fed to the Fenton reaction vessel 103 via gravity feed. Likewise, the clean water 112 from the neutralization and sedimentation tank 106 may be gravity fed to a holding tank (not shown separately), or the like. A sludge pump 108 is an option for removing sediment from the neutralization and sedimentation tank 106 for further disposal.

EXAMPLE

A pump 101 supplies a waste stream, e.g., pinkwater, to the bottom of a pre-filter 102A containing a mixture of sand and zero-valent iron in a ratio of 15:85. The iron de-oxygenates the pinkwater as the iron transforms from $Fe^0$ to $Fe^{+2}$, and the sand filters colloidal and suspended particles from the pinkwater. The pre-filter 102A may be provided in the form of a disposable cartridge, or be an adapted sand filter available from swimming pool supply companies.

As the pinkwater flows upwards through the zero-valent metal column reactor 102B, the energetics contained therein are reduced quickly by the zero-valent iron. For example, TNT is reduced to triaminotoluene (TAT) while RDX and HMX are reduced to ring-cleavage products. The effluent, which carries the reduction products and corrosion by-products, such as the ferrous ion ($Fe^{+2}$), then exits from the top of the column 102B and flows to the Fenton reaction vessel 103 by gravity. A gas vent 109 is located at the top of the column 102B to release any hydrogen gas generated from the anaerobic reduction process.

The Fenton oxidation process takes place in a Fenton reaction vessel 103 that in one configuration is a continuously stirred tank reactor (CSTR) that uses an externally powered mixing paddle 110. To the CSTR 103, a hydrogen peroxide solution is added continually to produce "Fenton's reagent" (i.e., hydrogen peroxide ($H_2O_2$) plus $Fe^{+2}$). In the presence of $Fe^{+2}$, hydrogen peroxide decomposes to form the hydroxyl radical (.OH), a very strong oxidizing agent, with $E^0=+2.33V$, that quickly oxidizes the reduction products of the energetics to stable end products such as carbon dioxide, water, and a nitrate. For the Fenton reaction to occur optimally, the pH in the CSTR 103 is maintained within a range of 2.0-3.0 using a mix control system 104 (e.g., pH meter, recorder, and automated controller) to add the necessary pH reducer, such as a sulfuric acid solution ($H_2SO_4$), from an acid source 111. The contents of the CSTR 103 are continuously stirred with one or more mixing paddles 110, such as those used with impeller mixers. Under normal operation, addition of iron to the CSTR 103 is not required. However, should the need arise, iron, as a ferrous ion ($Fe^{+2}$), may be injected in the same manner as the acid.

The treated effluent from the CSTR 103 flows into a neutralization and sedimentation tank 106 by gravity, where it is pH-neutralized by adding a base, such as sodium hydroxide (NaOH), from a supply tank 107 or other source. By bringing the pH to a neutral value in the range of 6.0-8.0, a sludge containing a ferric hydroxide is formed from precipitation of the ferric ion. The sludge is collected and removed at the bottom of the neutralization and sedimentation tank 106 via a sludge pump 108. The treated water 112 exits the top of the neutralization and sedimentation tank 106 and may be re-used.

Although a preferred embodiment of the present invention focuses on pinkwater treatment, any waste containing energetic compounds (explosives, propellants, and other pyrotechnic compounds) may be treated efficiently by this system and method. For example, waste generated from demilitarization activities; air scrubber fluids or solution containing energetic compounds; clean-up site lagoon water containing energetic compounds; and ground water contaminated with energetics that is pumped to the surface for treatment.

While the invention has been described in terms of some of its embodiments, those skilled in the art will recognize that the invention can be practiced with modifications within the spirit and scope of the appended claims. For example, although the system is described in specific examples for treating specific energetics, it may apply to any number of applications including oxygenated waste streams not associated with the production of energetics. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Thus, it is intended that all matter contained in the foregoing description or shown in the accompanying drawings shall be interpreted as illustrative rather than limiting, and the invention should be defined only in accordance with the following claims and their equivalents.

Although specific functions for this system and method have been described, other functions using the described apparatus and method are not excluded from falling within the ambit of the claims herein.

The abstract is provided to comply with the rules regarding an abstract, which will allow a searcher to quickly ascertain the subject matter of the technical disclosure of any patent issued from this disclosure. 37 CFR § 1.72(b). Any advantages and benefits described may not apply to all embodiments of the invention.

We claim:

1. A system for converting a waste stream resultant from manufacturing energetics, in particular explosives, said waste stream containing suspended and colloidal solids, comprising:

at least one zero-valent column reactor comprising:
at least one pre-filter containing a zero-valent metal and filter media for removing at least some of said solids from said waste stream,
at least one zero-valent metal contained in said reactor above said pre-filter,
wherein said pre-filter physically removes at least some of said solids, each said pre-filter positioned as the bottom portion of each said column reactor, and
wherein said column reactor establishes a reducing environment in a portion of each said column reactor contiguous with and vertically above said pre-filter, said reducing environment removing oxygen using said zero-valent metal as a reducing agent, and
wherein at least some of said zero-valent metal is provided as a metal ion, and
wherein after said waste stream is treated in said zero-valent column reactor, a first treated waste stream is output;

at least one first vessel in which initial contents include at least an oxidizer to be combined with said first treated waste stream,
wherein said contents of said first vessel are adjusted to optimize the amount of said oxidizer and a metal ion added thereto, said metal ion resultant from processing said waste stream with said zero-valent metal in said zero-valent metal column reactor, and
wherein said contents of said first vessel are further adjusted to optimize the pH of said contents of said first vessel, and wherein said contents of said first vessel are continuously stirred as part of treating said contents prior to output of said contents as a second treated waste stream; and at least one second vessel for accepting said second treated waste stream as at least part of the contents of said second vessel, wherein the pH of said second treated waste stream is adjusted in said second vessel, and wherein said contents of said second vessel are further adjusted to optimize pH of said contents of said second vessel, and wherein said second treated waste stream is permitted to settle prior to drawing off at least one final product for recycling.

2. The system of claim 1 in which said energetics are selected from the group consisting of TNT, RDX, HMX, nitroglycerin (NG), and constituents and combinations thereof.

3. The system of claim 1 in which said filter media is a naturally occurring material.

4. The system of claim 3 in which said naturally occurring material is sand.

5. The system of claim 1 in which said filter media is manmade.

6. The system of claim 1 in which said metal is selected from the group consisting of: iron, tin, aluminum, zinc, magnesium, nickel, palladium, platinum, and combinations thereof.

7. The system of claim 6 in which said metal is predominantly elemental iron ($Fe^0$), wherein, upon reaction of said elemental iron with said waste stream, at least part of said elemental iron is converted to the ferrous ion ($Fe^{+2}$) and at least part of said ferrous ion is a part of said first treated waste stream.

8. The system of claim 1 in which said pre-filter is a replaceable cartridge.

9. The system of claim 1 in which said zero-valent metal column reactor is vented.

10. The system of claim 1 further comprising a mix control module, wherein automated control of the characteristics of said contents of said first and second vessels is accomplished via said mix control module, and wherein said mix control module at least monitors and controls the pH of each of said first and second vessels, and wherein said mix control module controls the amount of said metal ion and said oxidizer available in said first vessel, and wherein said mix control module controls the amount of additive to add to said second vessel.

11. The system of claim 1 further comprising an impeller mixer for use in said first vessel.

12. The system of claim 1 in which said first vessel is a continuously stirred tank reactor (CSTR).

13. The system of claim 1 in which said oxidizer is hydrogen peroxide ($H_2O_2$).

14. The system of claim 1 in which said second vessel is a sedimentation tank, wherein the pH of said second treated waste stream is neutralized within the range of 6.0-8.0 by adding a base, and wherein any said suspended solids within said second treated waste stream are permitted to settle, forming sludge, and wherein the aqueous portion of said second treated waste stream is recycled.

15. The system of claim 14 in which said base comprises at least some sodium hydroxide (NaOH).

16. The system of claim 14 further comprising at least one sludge pump.

17. The system of claim 1 in which said first vessel is positioned lower than said zero-valent metal column reactor thus enabling gravity feed of said first treated waste stream from said zero-valent metal column reactor, and said second vessel is positioned at a position lower than said first vessel thus enabling gravity feeding of said second treated waste stream to said second vessel.

18. A system for converting a waste stream resultant from manufacturing energetics, in particular explosives, said waste stream also containing suspended and colloidal solids, comprising:

at least one means for pre-filtering, said means for pre-filtering containing a zero-valent metal and media for removing at least some of said solids from said waste stream to yield a filtered waste stream;

at least one means for reacting a zero-valent metal with said pre-treated waste stream, said means for reacting a zero-valent metal with said pre-treated waste stream in operable communication with said means for pre-filtering, wherein after said pre-treated waste stream is treated in said means for reacting a zero-valent metal with said pre-treated waste stream, a first treated waste stream incorporating at least one type of metal ion is output;

at least one means for combining said first treated waste stream with at least an oxidizer, wherein said combination of said oxidizer and said first treated waste stream is adjusted to optimize the amount of said oxidizer and said metal ion, at least some said metal ion resultant from processing in said means for reacting a zero-valent metal with said pre-treated waste stream, and wherein said contents of said means for combining said first treated waste stream with at least an oxidizer are further adjusted to optimize the pH of said contents of said means for combining said first treated waste stream with at least an oxidizer, and wherein said contents of said means for combining said first treated waste stream with at least an oxidizer are stirred as part of processing said contents of said means for combining prior to output of said contents of said means for combining as a second treated waste stream; and at least one means for accepting said second treated waste stream as at least part of the contents of said means for accepting said second treated waste stream, wherein said contents of said means for accepting said second treated waste stream are further adjusted to optimize pH of said contents of said means for accepting said second treated waste stream, and wherein said second treated waste stream is permitted to settle in said means for accepting said second treated waste stream prior to drawing off at least one final product for recycling.

19. The system of claim 18 further comprising means for mix control, wherein automated control of the characteristics of said contents of said means for combining said first treated waste stream with at least an oxidizer and said means for accepting said second treated waste stream is accomplished via said means for mix control, and wherein said means for mix control at least monitors and controls the pH of each of said means for combining said first treated waste stream with at least an oxidizer and said means for accepting said second treated waste stream, and wherein said means for mix control controls at least the amount of said metal ion and said oxidizer available in said means for combining said first treated waste stream with at least an oxidizer.

20. The system of claim 18 further comprising means for monitoring at least pressure in said means for pre-filtering and said means for reacting a zero-valent metal with said pre-treated waste stream.

* * * * *